United States Patent [19]

Haluska

[11] Patent Number: 4,482,689
[45] Date of Patent: Nov. 13, 1984

[54] PROCESS FOR THE PREPARATION OF POLYMETALLO(DISILY)SILAZANE POLYMERS AND THE POLYMERS THEREFROM

[75] Inventor: Loren A. Haluska, Midland, Mich.

[73] Assignee: Dow Corning Corporation, Midland, Mich.

[21] Appl. No.: 588,581

[22] Filed: Mar. 12, 1984

[51] Int. Cl.$^3$ .............................................. C08G 77/04
[52] U.S. Cl. ................................. 528/25; 427/288; 427/387; 428/408; 428/447; 264/29.1; 264/29.2; 264/29.3; 264/29.5; 264/29.6; 264/29.7; 423/344; 423/345; 423/347; 528/31; 528/32; 528/38; 528/43; 556/412

[58] Field of Search .............. 427/228, 387; 428/447, 428/408; 264/29.1, 29.2, 29.3, 29.5, 29.6, 29.7; 423/344, 345, 347; 528/25, 38, 31, 32, 43; 556/412

[56] References Cited

U.S. PATENT DOCUMENTS

| | | | |
|---|---|---|---|
| 4,152,509 | 6/1979 | Yajima et al. | 528/4 |
| 4,220,600 | 9/1980 | Yajima et al. | 556/434 |
| 4,340,619 | 7/1982 | Gaul | 427/228 |
| 4,347,347 | 8/1982 | Yajima et al. | 528/30 |
| 4,359,559 | 11/1982 | Yajima et al. | 525/475 |
| 4,404,153 | 9/1983 | Gaul, Jr. | 528/38 |

*Primary Examiner*—Melvyn I. Marquis
*Attorney, Agent, or Firm*—Richard A. Kaba

[57] ABSTRACT

What is disclosed is a process for preparing $R_3'SiNH$-containing metallosilazane polymer containing boron, titanium, or phosphorous by contacting and reacting chlorine-containing disilanes and certain reactive metal halides with $[R_3'Si]_2NH$ where $R'$ is vinyl, hydrogen, or alkyl radical of 1-3 carbon atoms, or phenyl. Preferred reactive metal halides include $BBr_3$, $TiCl_4$, and $PCl_3$. The metallosilazane polymers are useful as chemical intermediates to provide silicon-containing chemical compounds. The metallosilazane polymers are also useful in the formation of ceramic material. The ceramic materials may be formed by heating the metallosilazane polymer at elevated temperatures in an inert atmosphere or in a vacuum.

68 Claims, No Drawings

PROCESS FOR THE PREPARATION OF POLYMETALLO(DISILY)SILAZANE POLYMERS AND THE POLYMERS THEREFROM

BACKGROUND OF THE INVENTION

This invention relates to the preparation of metallosilazane polymers. More specifically this invention relates to the preparation of metallosilazane polymers which contain significant amounts of boron, phosphorous, or titanium. These polymers are useful as chemical intermediates to synthesize organosilicon compounds. These polymers are also useful, when fired at high temperatures, to form ceramic materials.

What is disclosed herein is a novel process to obtain novel metallosilazane polymers which consists of contacting and reacting chlorine-containing disilanes with disilazanes and metal halides in an inert, essentially anhydrous atmosphere and removing volatile by-products.

Gaul in U.S. Pat. No. 4,340,619 (issued July 20, 1982) disclosed a method for preparing R₃'SiNH-containing silazane polymers by contacting and reacting, in an inert, essentially anhydrous atmosphere, chlorine-containing disilanes with (R₃'Si)₂NH disilazanes where R' was a vinyl, hydrogen, alkyl of 1-3 carbon atoms, or phenyl group. The silazane polymers of Gaul were convertable to ceramic materials upon firing at elevated temperatures.

Yajima et al. in U.S. Pat. No. 4,220,600 (issued Sept. 2, 1980) disclosed a method for preparing a polycarbosilane by reacting a polyborosiloxane with a polysilane. The polyborosiloxanes were prepared by reacting boric acid (or its ester) with a diorganodichlorosilane or by reacting boric acid with diorganodialkoxylsilane. The preparation of borosiloxane polymers from boric acid and phenylsilane is described by Yajima et al. in U.S. Pat. No. 4,152,509 (issued May 1, 1979). The required polysilanes were prepared by dechlorinating a dichlorosilane with sodium metal. Therefore the method of Yajima required at least three reaction steps to prepare a polycarbosilane. The polycarbosilane contained significant amounts of oxygen in the polymer chain in the form of siloxane or B-O bonds. The polycarbosilane formed a ceramic material upon firing at high temperature. The ceramic yield was higher for the boron-containing polycarbosilane relative to a similar polycarbosilane without boron.

In U.S. Pat. No. 4,359,559 (issued Nov. 16, 1982), Yajima et al. repeated the preparation of a polymetallocarbosilane by reacting a polycarbosilane containing

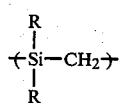

units with organometallic compounds MW₄ where M was either titanium or zirconium and W was an alkoxy group, a phenoxy group, or an acetylacetoxy group. The polymetallocarbosilane produced by this method contains significant amounts of oxygen in the polymer chain in the form of siloxane or M-O bonds. A ceramic material was formed upon firing the polymetallocarbosilane at elevated temperatures.

In U.S. Pat. No. 4,347,347 (issued Aug. 31, 1982), Yajima et al. disclosed an organometallic copolymer containing a polycarbosilane portion and a polymetallosiloxane portion which were crosslinked. This copolymer was prepared by reacting a polycarbosilane with a polymetallosiloxane which contained units of formula +M—O+ where M is either titanium or zirconium and siloxane units of formula +Si—O+. This process consists of at least three steps since neither the polycarbosilane or polymetallosiloxane are readily available. The copolymer produced contains significant amounts of oxygen in the polymer chain in the form of siloxane units and +M—O+ units. Upon firing at elevated temperatures the copolymer is converted to a ceramic material.

What has been newly discovered is that certain metallosilazane polymers can be prepared by reacting disilanes with silazanes and reactive metal halides.

THE INVENTION

The present invention concerns a new class of organometallic silazane polymers. In essence, a chlorine-containing disilane or a mixture of chlorine-containing disilane and a reactive metal halide are treated with a disilazane, as the nitrogen source, in sufficient amounts to react with most or all of the halide in the chlorine-containing disilane and metal halides. Usually about an equimolar amount of disilazane, based on the total halide content of the disilane and metal halide, is employed. The inventor does not wish to be held to such a theory but it is believed that when the reaction mixture is heated in an inert, essentially anhydrous atmosphere the following reactions, where

is the reactive metal halide, take place:

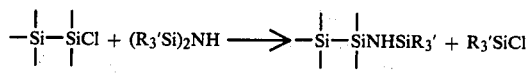

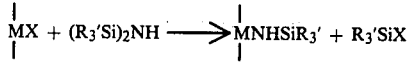

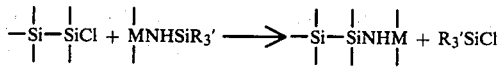

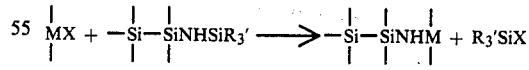

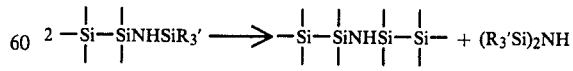

and

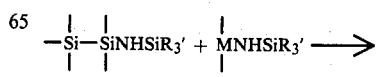

$$-\overset{|}{\underset{|}{Si}}-\overset{|}{\underset{|}{Si}}NHM + (R_3'Si)_2NH$$

Other reactions are also possible especially since both the disilane and the metal halide can contain other reactive halide radicals.

The reaction may be stopped by cooling the reaction mass thus giving polymers with any desirable viscosity and, therefore, any desirable molecular weight. The metallosilazane polymers may range in physical appearance from liquids, to high viscosity liquids, to hard glassy materials. The materials are therefore very easy to handle. They are essentially hydrolytically stable.

This invention relates to a process for preparing an $R_3'SiNH$-containing metallosilazane polymer, which process consists of contacting and reacting in an inert, essentially anhydrous atmosphere, a chlorine-containing disilane or a mixture of chlorine-containing disilanes of the general formula $$(Cl_aR_bSi)_2,$$

a disilazane having the general formula $$(R_3'Si)_2NH,$$

and a metal halide at a temperature in the range of 25° C. to 300° C. while distilling byproduced volatile products, wherein
- R is a vinyl radical, an alkyl radical containing 1-3 carbon atoms, or a phenyl radical;
- R' is a vinyl radical, a hydrogen radical, an alkyl radical containing 1-3 carbon atoms, or a phenyl radical;
- a has a value of 0.5-3;
- b has a value of 0-2.5;
- the sum of (a+b) is equal to three;
- the metal atom of said metal halide is selected from the group consisting of boron, phosphorous, and titanium;
- said metal halide is a liquid at the reaction temperature; and
- the boiling point of said metal halide is less than 300° C.

This invention also relates to a process for preparing an $R_3'SiNH$-containing metallosilazane polymer, which process consists of contacting and reacting in an inert, essentially anhydrous atmosphere, a chlorine-containing disilane or a mixture of chlorine containing disilanes of the general formula $$(Cl_aR_bSi)_2,$$

a disilazane having the general formula $$(R_3'Si)_2NH,$$

and a metal halide at a temperature in the range of 25° C. and the boiling point of said metal halide and thereafter removing byproduced volatile products by distillation at a temperature of less than 300° C., wherein
- R is a vinyl radical, an alkyl radical containing 1-3 carbon atoms, or a phenyl radical;
- R' is a vinyl radical, a hydrogen radical, an alkyl radical containing 1-3 carbon atoms, or a phenyl radical;
- a has a value of 0.5-3;
- b has a value of 0-2.5;
- the sum of (a+b) is equal to three;
- the metal atom of said metal halide is selected from the group consisting of boron, phosphorous, and titanium;
- said metal halide is a liquid at the reaction temperature; and
- the boiling point of said metal halide is less than 300° C.

This invention also relates to a new and novel composition of matter which is an $R_3'SiNH$-containing metallosilazane polymer which is prepared by contacting and reacting in an inert, essentially anhydrous atmosphere, a chlorine-containing, disilane or a mixture of chlorine-containing disilanes of the general formula $$(Cl_aR_bSi)_2,$$

a disilazane having the general formula $$(R_3'Si)_2NH,$$

and a metal halide at a temperature in the range of 25° C. to 300° C. while distilling byproduced volatile products, wherein
- R is a vinyl radical, an alkyl radical containing 1-3 carbon atoms, or a phenyl radical;
- R' is a vinyl radical, a hydrogen radical, an alkyl radical containing 1-3 carbon atoms, or a phenyl radical;
- a has a value of 0.5-3;
- b has a value of 0-2.5;
- the sum of (a+b) is equal to three;
- the metal atom of said metal halide is selected from the group consisting of boron, phosphorous, and titanium;
- said metal halide is a liquid at the reaction temperature; and
- the boiling point of said metal halide is less than 300° C.

Another object of this present invention is to provide a method of preparing a ceramic material which consists of heating an $R_3'SiNH$-containing metallosilazane polymer in an inert atmosphere or in a vacuum to at least a temperature of 750° C. until the $R_3'SiNH$-containing metallosilazane polymer is converted to ceramic material, which $R_3'SiNH$-containing metallosilazane polymer is obtained by a process which consists of contacting and reacting in an inert, essentially anhydrous atmosphere, a chlorine-containing, disilane or a mixture of chlorine-containing disilanes, wherein the number of diorgano-substituted silicon atoms does not exceed the number of monoorgano-substituted silicon atoms, said disilanes having the general formula $$(Cl_aR_bSi)_2,$$

a disilazane having the general formula $$(R_3'Si)_2NH,$$

and a metal halide at a temperature in the range of 25° C. to 300° C. while distilling byproduced volatile products, wherein R is a vinyl radical, an alkyl radical containing 1–3 carbon atoms, or a phenyl radical;

R' is a vinyl radical, a hydrogen radical, an alkyl radical containing 1–3 carbon atoms, or a phenyl radical;

a has a value of 0.5–3;

b has a value of 0–2.5;

the sum of (a+b) is equal to three;

the metal atom of said metal halide is selected from the group consisting of boron, phosphorous, and titanium;

said metal halide is a liquid at the reaction temperature; and the boiling point of said metal halide is less than 300° C.

Still yet another object of this present invention is a process for preparing an $R_3'SiNH$-containing metallosilazane polymer, which process consists of contacting and reacting in an inert, essentially anhydrous atmosphere, a disilazane having the general formula $(R_3'Si)_2NH$, and a metal halide with (i) a mixture of a chlorine-containing disilane having the general formula $(Cl_aR_bSi)_2$ and a chlorine-containing monosilane having the general formula $R_n'SiCl_{4-n}$;

(ii) a mixture of chlorine-containing disilanes having the general formula $(Cl_aR_bSi)_2$ mixed with a chlorine-containing monosilane having the general formula $R_n'SiCL_{4-n}$;

or (iii) a mixture of chlorine-containing disilanes having the general formula $(Cl_aR_bSi)_2$ mixed with a mixture of chlorine-containing monosilanes having the general formula $R_n'SiCl_{4-n}$ at a temperature in the range of 25° C. to 300° C. while distilling byproduced volatile products, wherein R is a vinyl radical, an alkyl radical containing 1–3 carbon atoms, or a phenyl radical;

R' is a vinyl radical, a hydrogen radical, an alkyl radical containing 1–3 carbon atoms, or a phenyl radical;

a has a value of 0.5–3;

b has a value of 0–2.5;

the sum of (a+b) is equal to three;

n has a value of 1 or 2;

the metal atom of said metal halide is selected from the group consisting of boron, phosphorous, and titanium;

said metal halide is a liquid at the reaction temperature; and the boiling point of said metal halide is less than 300° C.

Still yet another object of this present invention is a method for preparing a ceramic article which consists of (A) forming an article of the desired shape from an $R_3'SiNH$-containing metallosilazane polymer;

(B) heating the article prepared in (A) in an inert atmosphere or in a vacuum to an elevated temperature of at least 750° C. until the metalloailazane polymer is converted to a ceramic, which meatllosilazane polymer is obtained by a process which consists of contacting and reacting in an inert, essentially anhydrous atmosphere, a chlorine-containing disilane or a mixture of chlorine-containing disilanes, wherein the number of diorgano-substituted silicon atoms does not exceed the number of monoorgano-substituted silicon atoms, of the general formula $(Cl_aR_bSi)_2$, a disilazane having the general formula $(R_3'Si)_2NH$, and a metal halide selected from the group consisting of $BBr_3$, $TiCl_4$, and $PCl_3$ at a temperature in the range of 125° C. to 300° C. while distilling byproduced volatile products, wherein R is a vinyl radical, an alkyl radical containing 1–3 carbon atoms, or a phenyl radical;

R' is a vinyl radical, a hydrogen radical, an alkyl radical containing 1–3 carbon atoms, or a phenyl radical;

a has a value of 0.5–3;

b has a value of 0–2.5;

the sum of (a+b) is equal to three;

the metal halide is present in such amounts so that the resulting metallosilazane polymer contains 0.05 to 10.0 weight precent of said metal atom.

Still other objects will be apparent to those skilled in the art upon consideration of the specification.

The invention described herein results in new compositions of matter which are an improvement in the art, in that, essentially hydrolytically stable, easy to handle metallosilazane polymers can be prepared. When fired at temperatures above 750° C. in an inert atmosphere or in a vacuum, a ceramic material is obtained with a better ceramic yield and, generally, better heat resistance than the ceramic material from prior art silazane polymers.

The chlorine-containing disilanes of this invention are those disilanes having the general formula $(Cl_aR_bSi)_2$.

In this formula, R is vinyl, an alkyl radical containing 1–3 carbon atoms or the phenyl group. Thus, those groups which are contemplated as being useful in this invention are methyl, ethyl, propyl, vinyl and phenyl. For purposes of this invention, the R groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1).

For purposes of this invention, the values of a and b are from 0.5-3 and 0-2.5, respectively, and the sum of (a+b) is equal to three. Examples of chlorine-containing disilanes useful in this invention are [Cl(CH$_3$)$_2$Si]$_2$, (Cl$_2$CH$_3$Si)$_2$, (Cl$_2$C$_2$H$_5$Si)$_2$, [Cl(C$_6$H$_5$)$_2$Si]$_2$ and (Cl$_2$CH$_2$=CHSi)$_2$.

Monosilanes useful in admixture with the disilanes of this invention include, for example, CH$_3$SiCl$_3$, (CH$_3$)$_2$SiCl$_2$, H(CH$_3$)$_2$SiCl, (CH$_3$)$_3$SiCl, (CH$_2$=CH)(CH$_3$)$_2$SiCl, (C$_6$H$_5$)(CH$_2$=CH)(CH$_3$)SiCl, (C$_2$H$_5$)$_2$SiCl$_2$, (C$_6$H$_5$)(CH$_2$=CH)SiCl$_2$, C$_6$H$_5$SiCl$_3$, (C$_6$H$_5$)$_2$SiCl$_2$, and (C$_6$H$_5$)$_3$SiCl.

Also considered within the scope of this invention is the use of mixtures of chlorine-containing disilanes. One aspect of this invention requires that whenever certain chlorine-containing disilane mixtures are required, the number of units of diorgano-substituted silicon atoms should not exceed the number of units of monoorgano-substituted silicon atoms. Even though metallosilazane polymers can be formed from chlorine-containing disilane mixtures wherein the number of diorgano-substituted units does exceed the number of monoorgano-substituted units, it has been found that these polymers do not have the handling properties for formability because of low viscosities.

The second reactant in this invention is a disilazane of the general formula (R$_3$'Si)$_2$NH. For purposes of this invention R' is vinyl, hydrogen or has the same meaning as R above. Thus R' in this formula is vinyl, hydrogen, an alkyl radical of 1-3 carbon atoms or the phenyl group. Therefore, R', for purposes of this formula is represented by hydrogen, methyl, ethyl, propyl, vinyl and phenyl. As set forth above, each R' group in this formula can be the same or they can be different. Examples of compounds contemplated within the scope of this invention include: [(CH$_3$)$_3$Si]$_2$NH, [C$_6$H$_5$(CH$_3$)$_2$Si]$_2$, [(C$_6$H$_5$)$_2$CH$_3$Si]$_2$NH, [CH$_2$=CH(CH$_3$)$_2$Si]$_2$NH, [(C$_6$H$_5$)(CH$_2$=CH)(CH$_3$)Si]$_2$NH, [(CH$_2$=CH)(C$_6$H$_5$)$_2$Si]$_2$NH, [CH$_2$=CH(C$_2$H$_5$)$_2$Si]$_2$NH, [(CH$_2$=CH)C$_6$H$_5$(C$_2$H$_5$)Si]$_2$NH, [H(CH$_3$)$_2$Si]$_2$NH, [H$_2$(CH$_3$)Si]$_2$NH and [H(C$_6$H$_5$)CH$_3$Si]$_2$NH.

The third reactant in this invention is a reactive metal halide where the metal atom in the metal halide is boron, phosphorous, or titanium. The metal halide must be liquid at the reaction temperature and must have a boiling point of less than 300° C. at atmospheric pressure. Suitable metal halides include BBr$_3$, BBr$_2$I, BBrI$_2$, BI$_3$, PBr$_3$, PCl$_3$, TiBr$_4$, and TiCl$_4$. If either BI$_3$ or TiBr$_4$ is employed the reaction temperature must be above the melting point of the halide. Preferred metal halides include BBr$_3$, PCl$_3$, and TiCl$_4$. The metal halides are present in an amount such that the resulting metallosilazane polymer contains from about 0.05 to about 10 weight percent of the metal associated with the metal halide (i.e., boron, phosphorous, or titanium). Higher amounts of the metal may be incorporated into the metallosilazane polymers but such higher amounts do not seem to provide any additional benefit. It is generally preferred that the metallosilazane polymer contains about 0.5 to 5.0 weight percent of the metal atom. Combinations of metal halide reactants may also be employed. One preferred combination is boron and titanium halides. Metallosilazane polymer containing boron and phosphorous or titanium and phosphorous generally did not exhibit any increase in ceramic yield when fired to elevated temperatures in an inert atmosphere. The most preferred metal halide for the practice of this invention is BBr$_3$.

These reactants are brought together in an inert, essentially anhydrous atmosphere. For purposes of this invention what we mean by "inert" is that the reaction is carried out under a blanket of inert gas, such as argon or nitrogen or helium. What we mean by "essentially anhydrous" is that the reaction is preferably carried out in an absolutely anhydrous atmosphere but minute amounts of moisture can be tolerated.

When the reactants are contacted with each other, reactions begin which form an intermediate disilane amino compound, i.e.,

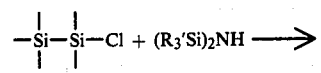

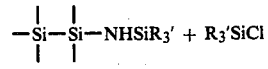

and an intermediate metallo amine compound, i.e.,

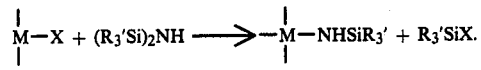

Upon heating, additional disilane amino and metallo amino compounds are formed. Upon continued heating, R$_3$'SiCl is removed from the reaction mixture and various silazane and metallosilazane polymers are formed, i.e.,

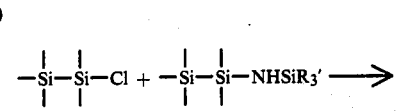

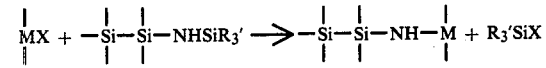

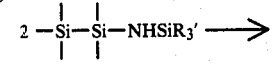

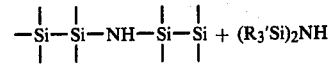

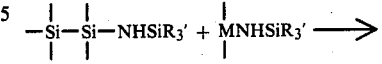

-continued

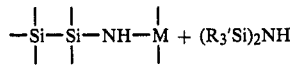

As one skilled in the art would realize, extensive chain extention and crosslinking reactions can occur since many of the chlorine-containing disilanes contain two or more chlorines and the reactive metal halides have either three or four reactive halide atoms.

Generally, the reactants (disilanes, disilazanes, and metal halides) are heated with the volatile byproducts being removed simultaneously. If desired, however, the reactants may be initially heated without removing the volatile byproducts. For example, the reactants may initially be heated under reflux condition and the volatile byproducts being removed at a later time.

The order of addition of the reactants does not appear to be critical. As the temperature is raised higher, more condensation takes place and crosslinking occurs, with residual $R_3'Si$— that is not distilled from the mixture, acting as a chain-stopper. This control allows one to stop the reaction at any point to obtain almost any desired viscosity. The desirable temperature range for this reaction is 25° C. to 300° C. The most preferred range is 125° C. to 300° C. The length of time that the reaction requires depends on the temperature and the viscosity one wishes to achieve.

What is meant by "volatile products" are the distillable byproduced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$, $H(CH_3)_2SiCl$ and $(CH_2=CH)(CH_3)_2SiCl$. Sometimes, these materials require the use of a vacuum along with the heat in order to remove them from the reaction mixture.

The metallosilazane polymers are then essentially ready to use. The metallosilazane polymers may be vacuum stripped prior to use if desired. It is preferred that any $NH_4Cl$ byproduct be removed prior to forming a ceramic product. One method is to dissolve the reaction products in an organic solvent in which $NH_4Cl$ is insoluble (i.e., for example, heptane or toluene) and remove the $NH_4Cl$ by filtration. Normally, the product residue contains about 3-5 weight percent $NH_4Cl$. The metallosilazane polymers are pyrolyzed in an inert atmosphere or in a vacuum at temperatures of at least 750° C. to give a ceramic-containing material. If the polymer is o f sufficient viscosity, it can be shaped first (such as an extruded fiber) and then pyrolyzed to give a ceramic material or the polymers can be filled with ceramic type fillers (if desired) and then fired to at least 750° C. to obtain filled ceramic materials. Composites may also be prepared wherein the metallosilazane polymer serves as the matrix material with high modulus fibers. Composites may, for example, be prepared using the procedures described in application Ser. No. 482,679 filed Apr. 6, 1983, which is hereby incorporated by reference.

When mixtures of chlorine-containing disilanes are to be used, it is best if the chlorine-containing disilanes are mixed prior to contacting and reacting with the disilanes.

As mentioned above, some of the resulting metallosilazane polymers can be extruded to give various shapes such as fibers. It has been found that the polymers of this invention that have the handleability that enables one to extrude or form them are those polymers in which the number of diorgano-substituted silicon atoms do not exceed the number of monoorgano-substituted silicon atoms. Thus, if the polymer is to be extruded or otherwise formed, it should be prepared from disilanes and disilazanes wherein the diorgano-substituted silicon atoms do not exceed the number of monoorgano-substituted silicon atoms.

As mentioned above, the metallosilazane polymers of this invention can be used in both the filled and unfilled state, depending on the application. Thus, it is contemplated within the scope of this invention to coat substrates with filled and unfilled polymers and heat the substrates to produce ceramic coated articles. Fillers and adjuvants can be milled on 3 roll mills by simply mixing the polymers of this inventon with the fillers and making several passes on the mill. In the alternative, the polymers can be placed in solvents and the fillers and adjuvants can be added thereto and after mixing the solvent can be removed to give the filled polymer. The coating can be carried out by conventional means. The means used depends on the polymer and substrates used and the application one has in mind. Thus, these materials can be brushed, rolled, dipped or sprayed. In the filled state, it is sometimes necessary to trowel the polymer onto the substrate.

Whenever the metallosilazane polymers are converted to the ceramic state, it is done by pyrolyzing the polymer to a temperature of at least 750° C. in an inert atmosphere or in a vacuum. The pyrolyzed material is generally amorphous. It is assumed that silicon carbide and, perhaps, silicon nitride are present in the resulting, ceramic material. The ceramic products containing boron are generally coalescent in nature as compared to ceramic materials prepared from the prior art silazane polymers. The metallosilazane polymers containing phosphorous or titanium did not exhibit this coalescent characteristic when fired to elevated temperatures. Attempts to pyrolyze at or above 750° C. without an inert atmosphere lead to undesirable side reactions and therefore, caution should be exercised to be sure to exclude moisture and other potential reactants.

Now, so that those skilled in the art can better appreciate and understand the invention, the following examples are given. The examples are for purposes of illustration only and are not to be regarded as limitations.

In the following examples, the analytical methods used were as follows:

Percent silicon was determined by a fusion technique which consisted of converting the silicon material to soluble forms of silicon and then analyzing the soluble material quantitatively for total silicon by atomic absorption spectrometry.

Percent chlorine (residual) was determined by fusion of the halides with sodium peroxide and potentiometric titration with silver nitrate.

The penetration temperature was determined on a Thermomechanical Analyzer, Model 1090, from Dupont Instruments. The penetration temperature is related to the softening point.

Carbon, hydrogen, and nitrogen were determined on a C, H, N Elemental Analyzer, Model 1106, manufactured by Carlo Erba Strumentazione of Italy. The sample was combusted at 1030° C. and then passed over a chromium oxide bed at 650° C. and a copper bed at 650° C. The $N_2$, $CO_2$, and $H_2O$ produced were then separated and detected using a thermal conductivity detector.

Thermogravimetric analyses (TGA) were carried out on a Netzsch STA 429 (2400° C.) TGA instrument manufactured by Netzsch Instruments, Selb, West Germany. Sample sizes were 50–90 mg; heating rate was 10° C. per minute; helium gas flow was 200 cc per minute; and the sample crucible was $Al_2O_3$.

Boron, phosphorous, and titanium analyses were carried out by fusing the polymers with sodium peroxide in a closed nickel bomb and then dissolving the fusinate in an aqueous system. Boron was analyzed by either atomic adsorption spectrometry or inductively coupled plasma-atomic emission spectrometry. Phosphorous and titanium were analyzed by inductivity coupled plasma-atomic emission spectrometry.

The metallosilazane polymers were fired to elevated temperature using an Astro Industries Furnace 1000A (water cooled graphite heated model 1000.3060-FP-12) or a Lindberg furnace (Heavy Duty SB Type S4877A). Samples fired to 1200° C. in the Astro furnace were heated in an inert atmosphere using the following temperature program: 20°–480° C. at 73° C. per hour; 480°–600° C. at 67° C. per hour; 600°–800° C. at 90° C. per hour; 800°–1200° C. at 800° C. per hour; followed by holding at 1200° C. for about 0.9 hour. Samples fired in the Lindberg furnace were normally heated at a rate of 10.7° C. per minute to 1200° C. and immediately cooled. Fiber samples were, however, heated in the Lindberg furnace to 1200° C. at a rate of 10.7° C. per minute and then held at 1200° C. for about 40 minutes. The ceramic was cooled at a rate of about 20° C. per minute.

Unless indicated otherwise, the chlorine-containing disilane employed in the following examples was a distillation residue from a Direct Process reaction for the production of chlorosilanes from silicon and methylchloride. This mixture was redistilled prior to use. The disilane mixture contained, on the average, 44.7 weight percent tetrachlorodimethyldisilane, 36.2 weight percent trichlorotrimethyldisilane, 9.1 weight percent dichlorotetramethyldisilane, and 10.0 weight percent low boilers. The low boilers contain $(CH_3)_2SiCl_2$, $CH_3SiCl_3$, $(CH_3)_3SiCl$, etc.

In the reactions carried out below, the reaction apparatus was essentially the same in each case and consisted of a 500 or 1000 ml glass, round-bottomed flask equipped with a mechanical stirrer, gas inlet tube, distillation apparatus and a thermocouple to record temperature. The distillation apparatus was equipped to use a vacuum if needed. Unless stated otherwise, all process steps were carried out in an inert atmosphere.

Unless otherwise stated, all percentages are by weight.

COMPARATIVE EXAMPLE

Several silazane polymers which did not contain boron, phosphorous, or titanium were prepared for comparative purposes. Using the apparatus described above, 182 g of a disilane mixture (containing 44.7 percent tetrachlorodimethyldisilane, 36.2 percent trichorotrimethyldisilane, 9.1 percent dichlorotetramethyldisilane, and 10.0 percent low boilers) was added rapidly to 304 g hexamethyldisilazane under argon, The reactants were heated under argon to 200° C. while volatile byproducts were removed by distillation. The cooled reaction mass was dissolved in 300 ml of dry toluene under argon. The resulting solution was filtered through a Gelman Versapor AN1200 1.2 micron filter using a 142 mm Model 11872 filter apparatus manufactured by Gelman Instrument Company, Ann Arbor, Mich., and stored under argon. The filtered solution was strip distilled at atmospheric (argon) pressure to 225° C. About 98 g of solid polymer was collected and stored under argon. The polymer contained 44.5 percent silicon, 27.8 percent carbon, 8.2 percent hydrogen, and 10.7 percent nitrogen. The polymer had a penetration temperature of 70° C. The polymer was fired to 1200° C. under argon using the Lindberg furnace. A ceramic yield of 50.4 percent was obtained.

Another comparative polymer was prepared in a similar manner. The same mixture of disilanes (182 g) was added to the hexamethyldisilazane (304 g) under argon. The reaction mass was heated to 200° C. under argon while the volatile byproducts were removed by distillation. The polymer was dissolved in 300 ml of dry heptane under argon. The polymer solution was filtered through a medium porosity fritted glass filter and stored under argon. The heptane solution was strip distilled at 200° C. under a 2 mm mercury vacuum. A solid polymer (68 g) was obtained and stored under argon. The polymer contained 44.3 percent silicon, 30.9 percent carbon, 8.6 percent hydrogen, and 12.7 percent nitrogen and had a penetration temperature of 60° C. The polymer was fired in a Lindberg furnace to 1200° C. in argon and gave a ceramic yield of 47.1 percent. TGA gave a 53 percent weight loss from 200° 800° C., almost no weight loss from 800° to 1400° C., and 4 percent weight loss from 1400° to 1550° C. with a cumulative weight loss of 57 percent.

A total of six silazane polymers similar to those just described were prepared as control samples. A total of ten firings were made in the Lindberg furnace at 1200° C. under an argon atmosphere. An average ceramic yield of 48.8 percent (with a standard deviation of 2.2 percent) was obtained.

EXAMPLE 1

The example illustrates the preparation of a metallosilazane polymer containing about 0.1 percent boron. Hexamethyldisilazane (309 g) was placed in the reaction vessel equipped with the distillation apparatus. An argon purge or atmosphere was maintained throughout the reaction sequence. A mixture consisting of $BBr_3$ (2.65 g) and the chlorine-containing disilanes (182 g) described in the Comparative Example was added to the disilazane. The reaction mixture was strip distilled to 200° C. The polymer residue was dissolved in 300 ml of dry toluene. The polymer solution was filtered (medium glass frit) and then strip distilled at 225° C. and 1 atmosphere. About 91 g of polymer was collected and stored under argon. The polymer contained 44.4 percent silicon and 12.6 percent nitrogen. (Carbon and hydrogen were not determined.) Boron was not detected since the detection limit was 0.2 percent. The penetration temperature of the polymer was 82° C. A sample of the metallosilazane polymer was fired to 1200° C. under argon in the Lindberg furnace. A ceramic yield of 54.4 percent was obtained. The ceramic obtained was coalescent in nature as compared with the ceramic material of the Comparative Example.

EXAMPLE 2

This example illustrates the preparation of a metallosilazane polymer containing about 0.5 percent boron. A mixture of the same disilanes (182 g) as used in Example 1 and $BBr_3$ (13.3 g) was placed in the reaction vessel equipped with a distillation apparatus. The process was kept under argon at all times. Hexamethyldisilazane (342 g) was rapidly added. The resulting mixture was strip distilled to 207° C. over a 45 minute time period. About 390 g of distillate, which contained about 84 percent $(CH_3)_3SiCl$, 14 percent $[(CH_3)_3Si]_2NH$, and 2 percent $(CH_3)_3SiBr$, was collected. The reaction residue was dissolved in 400 ml of dry toluene and then filtered using a medium porosity glass fritted filter. The filtered solution was strip distilled to 193° C. under argon to give 116 g of polymer product. The polymer contained 41.8 percent silicon, 27.9 percent carbon, 7.6 percent hydrogen, 13.6 percent nitrogen, and 0.4 percent boron. Two samples of this polymer were fired to 1200° C. under argon. Both samples gave a coalescent ceramic with a ceramic yield of 58 percent.

EXAMPLE 3

This example describes the preparation of a metallosilazane polymer containing about 1 percent boron. All procedures, except as noted, were carried out under an argon atmosphere. A mixture of $BrBr_3$ (26.5 g) and the disilanes (182 g) described in Example 1 were added to hexamethyldisilazane (342 g) in the reaction vessel. The temperature rose to 52° C. The reaction mixture was strip distilled to 201° C. The product residue was dissolved in 500 ml of dry toluene and filtered through a 1.2 micron filter. Upon stripping to 201° C. a solid metallosilazane polymer (99.3 g) was obtained. The polymer contained 0.8 percent boron. A sample fired to 1200° C. in argon in the Lindberg furnace gave a ceramic yield of 58.2 percent.

Fibers were prepared with the metallosilazane polymer using a melt rheometer with a ⅜ inch heat barrel and a 20 micron spinneret at a temperature of 148°–150° C. The fibers were precured at 100° C. in air for 3.5 hours before being fired at elevated temperature. Fibers with an average diameter of 60 microns were fired to 1200° C. in the Lindberg furnace for 2.5 hours in argon. The temperature was held at 1200° C. for about 40 minutes. The ceramic fibers had an average tensile strength of 92 kpsi. Another group of fibers with an average diameter of 52 microns was fired in the Astro furnace to 1200° C. for 12.5 hours under a helium atmosphere. The average tensile strength of the Astro-fired fibers was 77 kpsi.

A TGA for this metallosilazane polymer was obtained. Between 200° and 800° C. a 37% weight loss was noted; between 800°–1550° C. the weight loss was less than 1 percent; and the overall weight loss for 200°–1550° C. ws about 38%.

EXAMPLE 4

This example illustrates the preparation of a metallosilazane polymer containing about 2 percent boron. $BBr_3$ (100 g) was rapidly added to 612 g of hexamethyldisilazane. The temperature rose to 68° C. A mixture of disilanes (182 g), as described in Example 1, was quickly added to the reaction. No further exotherm was observed. All process steps were carried out under argon. The reaction products were strip distilled to 161° C. The product residue was dissolved in 300 ml dry toluene and then filtered through a medium glass frit filter. The filtered solution was strip distilled at 75° C. and 130 mm mercury followed by 200° C. at atmospheric pressure. 136.5 g of polymer were collected. The metallosilazane polymer contained 37.9 percent silicon and 1.9 percent boron. A penetration temperature of 91° C. was measured. IR analysis showed a broad band at 1450–1380 cm$^{-1}$ tentatively assigned to a B—N bond. A small band at 1345 cm$^{-1}$ could be due to the presence of a small amount of B—O. Otherwise the IR spectra is similar to the spectra of polymers similar to those prepared in the Comparative Example. Adsorptions due to $NH_4Cl$ were observed. No adsorptions assignable to Si—O—Si were observed. The polymer was fired to 1200° C. in the Lindberg furnace in argon with a ceramic yield of 61.6 percent.

Another metallosilazane polymer was prepared in a similar manner except that the reactants were first refluxed and then the volatile byproducts were removed. The distillation apparatus was replaced with a reflux condenser for the initial reaction. All process steps were carried out under argon. Hexamethyldisilazane (342.2 g) was added to a mixture containing the disilanes (182 g) as described in Example 1 and $BBr_3$ (26.5 g). The reaction mixture exothermed to 60° C. The reaction mixture was refluxed for one hour. Volatile byproducts were then removed by strip distillation to 216° C. The distillate (317 g) contained about 64.8 percent $(CH_3)_3SiCl$, 11.0 percent $(CH_3)_3SiBr$, and 24.2 percent $[(CH_3)_3Si]_2NH$. The product residue was dissolved in 300 ml dry toluene and then filtered. The metallosilazane polymer was collected by strip distillation of 210° C. of the filtered toluene solution. The metallosilazane polymer contained 41.7 percent silicon, 32.2 percent carbon, 7.2 percent hydrogen, 15.8 percent nitrogen, and 1.6 percent boron. The polymer was fired to 1200° C. under argon in the Lindberg furnace with a ceramic yield of 59.6 percent. The cermaic material contained 53.7 percent silicon, 18.4 percent carbon, 22.5 percent nitrogen, and 1.8 percent boron. Examination of the material by X-ray diffraction did not show any evidence of crystallinity.

EXAMPLE 5

This example shows the preparation of a metallosilazane polymer containing about 3 percent boron. $BBr_3$ (97 g), hexamethyldisilazane (553 g), and the disilanes (134 g) described in Example 1 were reacted as described for the first metallosilazane polymer in Example 4 except the filtered toluene solution was stripped at 175° C. and 69 mm mercury vacuum. The yield of solid metallosilazane polymer was 43 g. The metallosilazane contained 37.1 percent silicon and 3.1 percent boron and had a penetration temperature of 96° C. A ceramic yield of 54.6 percent was observed upon firing to 1200° C. under argon in the Lindberg furnace.

Examples 1–5 all show metallosilazane polymers containing various amounts of boron. The ceramic yield data for these metallosilazane polymers fired to 1200° C. is summarized below.

| Example | Percent Boron | Ceramic Yield, % | Increase in Ceramic Yield Relative to Comparative Example, % |
|---|---|---|---|
| Comparative | 0 | 48.8 | — |
| 1 | <0.2 | 54.4 | +11.5 |
| 2 | 0.4 | 58.0 | +18.8 |
| 3 | 0.8 | 58.2 | +19.3 |
| 4 | 1.9 | 61.6 | +26.2 |
|   | 1.6 | 59.6 | +22.1 |
| 5 | 3.1 | 54.6 | +11.9 |

Clearly the presence of boron in the metallosilazane polymer significantly increased the ceramic yield of the fired product relative to a fired silazane polymer which does not contain boron.

EXAMPLE 6

This example illustrates the preparation of metallosilazane polymers containing boron from a mixture of disilanes and dichlorodiphenylsilane. A mixture of the disilanes (182 g) of Example 1, dichlorodiphenylsilane (18.2 g), and BBr$_3$ (53.0 g) was dded to hexamethyldisilazane (387 g). An argon blanket was used throughout. The reaction mixture exothermed to 71° C. After the reaction mixture was strip distilled to 210° C., the reaction product was dissolved in 400 ml of dry toluene. The toluene solution was filtered through a 1.2 micron filter and then strip distilled to 201° C. The yield was about 113 g of a solid polymer. The boron-containing silazane polymer contained 36.2 percent silicon, 32.6 percent carbon, 7.8 percent hydrogen, 13.1 percent nitrogen, and 2.1 percent boron. IR analysis gave a broad band at 1450–1380 cm$^{-1}$, possibly due to B—N, and a small adsorption at 1345 cm$^-$, possibly due to B—O. No evidence of Si—O—Si bonds were observed. Adsorption bands due to NH$_4$Cl were observed. Upon firing to 1200° C. in an argon atmosphere using the Lindberg furnace, a ceramic yield of 60 percent was obtained.

A similar polymer was prepared by adding a mixture of the same disilanes (364 g) used above, dichlorodiphenylsilane (72.8 g) and BBr$_3$ (100 g) to 830 g of hexamethyldisilazane under an argon atmosphere. An argon atmosphere was used throughout the process. The temperature exothermed to 76° C. upon addition. The reaction mixture was strip distilled to 227° C. The reaction residue was dissolved in 500 ml of dry toluene and filtered through a 1.2 micron filter. The filtered solution, which was sparkling clear, was strip distilled to 212° C. A yield of 158 g of a solid clear amber colored product was obtained. The product contained 34.6 percent silicon, 36.4 percent carbon, 6.8 percent hydrogen, 17.0 percent nitrogen, and 1.7 percent boron. The polymer contained less than 25 ppm chlorine (the detection limit). The penetration temperature of the polymer was 128° C. The metallosilazne polymer had a molecular weight of about 3200 g per mole by vapor pressure osmometry using dry toluene as the solvent. Four different polymer samples were fired (Lindberg furnace) to 1200° C. under argon with an average ceramic yield of 69 percent. TGA gave a 33 percent weight loss from 200°–800° C., essentially no weight loss from 800°–1400° C., and about 1 percent weight loss from 1400°–1550° C. for an overall weight loss of 35 percent. An X-ray diffraction study of the ceramic material firmed in the TGA experiment fired to 1550° C. (under helium) showed no crystallinity.

EXAMPLE 7

This example demonstrates the preparation of a metallosilazane polymer containing boron from a mixture of disilanes and dichlorophenylvinylsilane. A mixture of the disilanes (182 g) used in Example 1, dichlorophenylvinylsilane (18.2 g), and BBr$_3$ (265 g) was added to hexamethyldisilazane (342 g). All process steps were carried out under argon. The reaction mixture was strip distilled to 228° C. The product residue was dissolved in 350 ml of dry heptane. About half of the heptane solution was lost by spillage. The remaining heptane solution was filtered (1.2 micron filter) and then strip distilled to 160° C. The product yield was 57 g. The solid polymer product was fired to 1200° C. under argon in the Lindberg furnace with a ceramic yield of 65 percent. TGA indicated a weight loss of 28 percent from 200°–800° C. and weight loss of about zero from 800°–1550° C. for an overall weight loss of 28 percent from 200°–1550° C. This phenyl and vinyl functional borosilazane polymer shows excellent heat stability.

EXAMPLE 8

A mixture of the disilanes (172 g) as used in Example 1 and BBr$_3$ (25.1 g) was rapidly added to hexamethyldisilazane (320.9 g) under an argon purge. Volatile byproducts were removed by strip distillation to 170° C. over a 1.9 hour period. A portion (14 g) of the solid product residue (crude metallosilazane) was collected and stored under argon. The remainder of the product residue was dissolved in about 260 g of dry toluene. About one-half of the product residue dissolved in toluene was filtered through a 1.2 micron filter. The filtered toluene solution was then strip distilled to 200° C. over 1.3 hours. A solid metallosilazane polymer (55.6 g) was collected.

Both the original product residue (crude metallosilazane) and the purified metallosilazane (dissolved in toluene, filtered, and stripped) were fired to 1200° C. under argon in the Lindberg furnace. The crude metallosilazane polymer yielded a ceramic material with a ceramic yield of 58.0 percent which is an improvement in the ceramic yield of about 20.5 percent relative to the nonboron-containing silazane polymer of the Comparative Example. The purified metallosilazane polymer yielded a ceramic material with a ceramic yield of 59.4 percent which represents a 21.7 percent improvement relative to the silazane polymer of the Comparative Example.

EXAMPLE 9

This example illustrates the preparation of a metallosilazane polymer containing about 0.1 percent titanium. All reaction steps were carried out under argon. A mixture of disilanes (182 g) as described in Example 1 and TiCl$_4$ (0.4 g) was added rapidly to hexamethyldisilazane (305 g). The reaction mixture was strip distilled to 165° C. The product residue was dissolved in 300 ml dry toluene and filtered. The solvent was removed by strip distilling the filtered solution to 225° C. The polymer contained 44.9 percent silicon, 26.8 percent carbon, 7.7 percent hydrogen, 12.1 percent nitrogen, and 0.1 percent titanium. A penetration temperature of 84° C. was observed. A solid polymer sample fired to 1200° C. under argon in the Lindberg furnace gave a ceramic product in a 50.2 percent yield.

EXAMPLE 10

This example demonstrates the preparation of a metallosilazane polymer containing, about 0.5 percent titanium. A mixture of disilanes (182 g) as described in Example 1 and TiCl$_4$ (2.1 g) was added to hexamethyldisilazane (311 g) under an argon atmosphere. All process steps were carried out under argon. The reaction mixture was strip distilled to 172° C. After dissolving the reaction residue in 300 ml dry toluene, the solution was filtered. The filtered solution was stripped to 225° C. to obtain a solid polymer. The polymer contained 43.9 percent silicon, 28.1 percent carbon, 8.0 percent hydrogen, 13.1 percent nitrogen, and 0.49 percent titanium. The polymer had a measured penetration temperature of 87° C. Polymer fired to 1200° C. in the Lindberg furnace under argon had a ceramic yield of 52.6 percent.

EXAMPLE 11

This example shows the preparation of a metallosilazane polymer containing about 1.0 percent titanium. Hexamethyldisilazane (304 g) was added to a mixture of the disilanes (182 g) described in Example 1 and TiCl$_4$ (5.0 g) under a nitrogen sweep. All process steps were carried out under an inert atmosphere. Upon mixing the reactants, the mixture turned orange although no exotherm was noted. The reaction mixture was strip distilled to 203° C. At about 160° C. during the strip distillation, the reaction mixture began to turn green. The reaction residue was dissolved in 400 ml dry toluene and then filtered through a 1.2 micron filter. The filtered solution was strip distilled to 212° C. The product (83.5 g) was a dark green solid. A ceramic material was formed when this polymer was fired in the Lindberg furnace to 1200° C. under argon. The ceramic yield was 54.0 percent. The resulting ceramic material was examined by X-ray diffraction. The material showed no crystallinity.

EXAMPLE 12

A metallosilazane polymer containing about 2 percent titanium is prepared in this example. A mixture of the disilanes (182 g) as described in Example 1 and TiCl$_4$ (10 g), which were premixed under nitrogen, was added rapidly to 330 g of hexamethyldisilazane under argon. An argon atmosphere was employed throughout the process. The reaction mixture was strip distilled to 155° C. The product residue was dissolved in 300 ml dry toluene and filtered through a medium glass frit filter. The toluene solvent was removed by strip distillation at 240° C. A yield of 84.7 g of solid polymer was obtained. The polymer contained 43.8 percent silicon, 28.1 percent carbon, 7.6 percent hydrogen, 15.8 percent nitrogen, 2.02 percent titanium, and 89 ppm chlorine. The polymer had a penetration temperature of 146° C. Upon firing the polymer to 1200° C. under argon using the Lindberg furnace, a ceramic material was obtained as a 62.1 percent yield. The ceramic contained 52.1 percent silicon and 1.61 percent titanium.

EXAMPLE 13

This example shows the preparation of a metallosilazane polymer containing about 5 percent titanium. A mixture of disilanes (182 g) as described in Example 1 and TiCl$_4$ (20 g) was added to 569 g of hexamethyldisilazane. All process steps were carried out under argon. The mixture was strip distilled to 155° C. over about an hour and one-half period. The reaction mixture was cooled and then dissolved in 300 ml toluene. The toluene solution was filtered through a coarse glass filter and then a fine glass filter. The filtered solution was strip distilled at 225° C. About 69 g of solid polymer was obtained. The polymer contained 40.3 percent silicon, 24.2 percent carbon, 7.1 percent hydrogen, 12.5 percent nitrogen, and 4.3 percent titanium. A penetration temperature of 121° C. was found for the polymer. A ceramic material was formed in a yield of 62.3 percent when the polymer was fired to 1200° C. under argon in the Lindberg furnace. A TGA study indicated a 35 percent weight loss at 200° to 800° C.; essentially no weight loss at 800°–1400° C.; an 8 percent weight loss at 1400°–1500° C.; and an overall weight loss of 51 percent from 200°–1550° C.

EXAMPLE 14

This example shows the preparation of a metallosilazane polymer containing about 8 percent titanium. A mixture of the disilanes (182 g) of Example 1 and TiCl$_4$ (45 g) was added to hexamethyldisilazane (460 g). All process steps were carried out under argon. After strip distilling the reaction mixture to 150° C. and cooling, 300 ml dry toluene was added. The toluene solution was filtered and then strip distilled to 138° C. A thick, gumlike polymer (68 g) was obtained which contained 36.2 percent silicon, 11.6 percent nitrogen, and 7.8 percent titanium. A ceramic yield of 61.0 percent was obtained upon firing the polymer to 1200° C. under argon in the Lindberg furnace.

Examples 9–14 show metallosilazane polymers containing various amounts of titanium. Upon firing these polymers to elevated temperatures in an inert atmosphere, ceramic materials are obtained. The ceramic yield data for these metallosilazane polymers fired to 1200° C. is summarized below.

| Example | Percent Titanium | Ceramic Yield, % | Increase in Ceramic Yield Relative to Comparative Example, % |
|---|---|---|---|
| Comparative | 0 | 48.8 | — |
| 9 | 0.1 | 50.2 | +2.3 |
| 10 | 0.49 | 52.6 | +7.8 |
| 11 | 1.0 | 54.0 | +10.7 |
| 12 | 2.02 | 62.1 | +27.2 |
| 13 | 4.3 | 62.3 | +27.7 |
| 14 | 7.8 | 61.0 | +25.0 |

Clearly the presence of titanium in the metallosilazane polymer significantly increases the ceramic yield of the fired product relative to the fired silazane polymer which does not contain titanium.

EXAMPLE 15

This example shows the preparation of a metallosilazane polymer containing about 0.1 percent phosphorous. A mixture of the disilanes (182 g) described in Example 1 and PCl$_3$ (0.4 g) were added to hexamethyldisilazane. All process steps were carried out under argon. The reaction mixture was strip distilled to 158° C. at atmospheric pressure. The product residue was dissolved in 300 ml toluene and filtered. The filtered solution was strip distilled to remove the solvent. A yield of about 96 percent of the solid metallosilazane polymer was obtained. The polymer contained 44.2 percent silicon, 26.9 percent carbon, 7.9 percent hydrogen, 12.1 percent nitrogen, and 0.1 percent phosphorous. The penetration temperature was 78° C. A ceramic product was obtained in a 50.6 percent yield upon firing the polymer to 1200° C. in the Lindberg furnace under an argon atmosphere.

EXAMPLE 16

This example illustrates the preparation of a metallosilazane polymer containing about 0.5 percent phosphorous. A mixture of disilanes (182 g) as described in Example 1 and PCl$_3$ (2.3 g) was added to 312 g of hexamethyldisilazane. All process steps were carried out under argon. The reaction mixture was stripped to 164° C. After dissolving the product residue in 300 ml dry toluene, the product residue solution was filtered. Solid polymer product (89 g) was collected by strip distillation at 225° C. The polymer contained 45.0 percent silicon, 27.5 percent carbon, 7.8 percent hydrogen, 11.2 percent nitrogen, and 0.47 percent phosphorous. The penetration temperature was 82° C. A ceramic product was obtained in a 51.4 percent yield upon firing the polymer to 1200° C. under argon in the Lindberg furnace.

EXAMPLE 17

A metallosilazane polymer containing about 1 percent phosphorous is described in this example. A mixture of disilanes (182 g) as described in Example 1 and PCl$_3$ (4.5 g) was added rapidly to hexamethyldisilazane (320 g) under argon. Argon was employed as an inert atmosphere during all processing steps. The reaction mixture was heated to 165° C. while removing volatile byproducts by distillation. After cooling, the product residue was collected in 300 ml of dry toluene. The product residue solution was filtered and then strip distilled to 218° C. at atmospheric pressure. The solid metallosilazane polymer (62.1 g) contained 45.2 percent silicon, 28.4 percent carbon, 8.0 percent hydrogen, 13.9 percent nitrogen, 0.87 percent phosphorous, and 62 ppm chlorine. The penetration temperature was 117° C. When the phosphorous-containing polymer was fired at 1200° C. in argon using the Lindberg furnace, a ceramic product was obtained in a 55.1 percent yield.

EXAMPLE 18

This example illustrates the preparation of a metallosilazane polymer containing about 2 percent phosphorous. A mixture of disilanes (182 g) as described in Example 1 and PCl$_3$ (11.1 g) was added to hexamethyldisilazane (343.7 g). All process steps were carried out in an argon atmosphere. The reaction mixture was strip distilled to 152° C. The reaction residue was taken up in 300 ml dry toluene and then filtered. The filtered product was strip distilled to 225° C. and 93 g of solid metallosilazane polymer was collected. The polymer contained 42.5 percent silicon, 23.0 percent carbon, 7.0 percent hydrogen, 3.8 percent nitrogen, and 2.11 percent phosphorous. The penetration temperature was 129° C. The polymer was fired to 1200° C. in argon (Lindberg furnace). A ceramic product was obtained with a ceramic yield of 60.2 percent. The ceramic contained 55.4 percent silicon, 19.3 percent nitrogen, 22.9 percent nitrogen, and 2.07 percent phosphorous.

EXAMPLE 19

This example shows the preparation of a metallosilazane polymer containing about 4 percent phosphorous. Disilanes (182 g) as described in Example 1, PCl$_3$ (22.2 g), and hexamethyldisilazane (384 g) were reacted by heating to 135° C. while removing volatile byproducts by distillation. The product residue was dissolved in 300 ml dry toluene and filtered. The toluene was removed from the filtered solution by strip distillation leaving 102 g of solid polymer. The polymer contained 41.8 percent silicon, 12.2 percent nitrogen, and 3.46 percent phosphorous. A penetration temperature of 103° C. was observed. A ceramic product was obtained (55.2 percent yield) upon firing the polymer to 1200° C. in argon using the Lindberg furnace. A TGA study gave a weight loss of 40 percent from 200°–800° C., essentially no weight loss from 800°–1400° C., a 3 percent weight loss from 1400°–1550° C., and an overall weight reduction of 43 percent from 200°–1550° C.

EXAMPLE 20

This example demonstrates the preparation of a metallosilazane polymer containing about 4 percent phosphorous. A mixture of disilanes (182 g) as described in Example 1 and PCl$_3$ (50 g) was added to hexamethyldisilazanes (417 g). All process steps were carried out in argon. The reaction mixture was strip distilled at 123° C. The product residue was dissolved in 300 ml dry toluene and filtered. The solid polymer product (113 g) was collected by removal of the solvent by strip distillation to 168° C. The polymer contained 36.2 percent silicon and 4.06 percent phosphorous. The polymer had a penetration temperature of 126° C. Phosphorous-31 NMR was run in deuterated chloroform. A broad signal around 0 ppm (relative to 85% H$_3$PO$_4$ external standard) was observed which is consistant with a four coordinate phosphorous. Apparently the NMR signal is significantly broadened due to equadrupole interaction with nitrogen-14 nuclei. A ceramic product was obtained in 55.4 percent yield upon firing the polymer to 1200° C. under argon in the Lindberg furnace.

Examples 15–20 show metallosilazane polymers containing varying amounts of phosphorous. Upon firing these polymers to elevated temperatures in an inert atmosphere, ceramic materials are obtained. The ceramic yield data for these metallosilazane polymers fired to 1200° C. is summarized below.

| Example | Percent Phosphorous | Ceramic Yield, % | Increase in Ceramic Yield Relative to Comparative Example, % |
|---|---|---|---|
| Comparative | 0 | 48.8 | — |
| 15 | 0.1 | 50.6 | +3.7 |
| 16 | 0.47 | 51.4 | +5.3 |
| 17 | 0.87 | 55.1 | +12.9 |
| 18 | 2.11 | 60.2 | +23.4 |
| 19 | 3.46 | 55.2 | +13.1 |
| 20 | 4.06 | 55.4 | +13.5 |

Clearly the presence of phosphorous in the metallosilazane polymer significantly increases the ceramic yield of the fired product relative to the fired silazane polymer without phosphorous.

EXAMPLE 21

This example illustrates the preparation of a metallosilazane polymer which contains both boron and titanium. A mixture of the disilanes (182 g) of Example 1, BBr$_3$ (26.5 g), and TiCl$_4$ (5.0 g) was added to 374 g of hexamethyldisilazane under argon. All processing steps were carried out under argon. The reaction mixture exothermed to 59° C. The reaction mixture was strip distilled to 160° C. The product residue was taken up in 300 ml dry toluene and filtered. The filtered solution was strip distilled to 225° C. to give 85 g of a solid polymeric product. The polymer contained 41.5 percent silicon, 13.1 percent nitrogen, 0.8 percent boron, and 0.8 percent titanium. The penetration temperature was 123° C. A ceramic yield of 61.2 percent was obtained upon firing the polymer to 1200° C. in argon using the Lindberg furnace. This ceramic yield represents a 25.4 percent increase in the ceramic yield relative to the Comparative Example case. TGA showed a 35 percent weight loss from 200°–800° C., essentially no weight loss from 800°–1400° C., and a 2 percent weight loss from 1400°–1550° C. for an overall weight loss of 37 percent from 200°–1550° C.

That which is claimed is:

1. A process for preparing an $R_3'SiNH$-containing metallosilazane polymer, which process consists of contacting and reacting in an inert, essentially anhydrous atmosphere, a chlorine-containing disilane or a mixture of chlorine-containing disilanes of a general formula $$(Cl_aR_bSi)_2,$$

a disilazane having the general formula $$(R_3'Si)_2NH,$$

and a metal halide at a temperature in the range of 25° C. to 300° C. while distilling byproduced volatile products, wherein R is a vinyl radical, an alkyl radical containing 1–3 carbon atoms, or a phenyl radical;
R' is a vinyl radical, a hydrogen radical, an alkyl radical containing 1–3 carbon atoms, or a phenyl radical;
a has a value of 0.5–3;
b has a value of 0–2.5;
the sum of (a+b) is equal to three;
the metal atom of said halide is selected from the group consisting of boron, phosphorous, and titanium;
said metal halide is a liquid at the reaction temperature; and
the boiling point of said metal halide is less than 300° C.

2. A process as defined in claim 1 where said $R_3'SiNH$-containing metallosilazane polymer contains 0.05 to 10.0 weight percent of said metal atom.

3. A process as defined in claim 2 wherein said metal halide is selected from the group consisting of $BBr_3$, $TiCl_4$, and $PCl_3$.

4. A process as defined in claim 3 wherein said metal halide is $BBr_3$ and said $R_3'SiNH$-containing metallosilazane polymer contains 0.5 to 2.5 weight percent boron.

5. A process as defined in claim 3 wherein said metal halide is $TiCl_4$ and said $R_3'SiNH$-containing metallosilazane polymer contains 1.0 to 5.0 weight percent titanium.

6. A process as defined in claim 3 wherein said metal halide is $PCl_3$ and said $R_3'SiNH$-containing metallosilazane polymer contains 0.5 to 5.0 weight percent phosphorous.

7. A process as defined in claim 2 wherein a mixture of chlorine-containing disilanes is used; wherein the mixture contains $[Cl_2(CH_3)Si]_2$, $[Cl(CH_3)_2Si]_2$, and $Cl(CH_3)_2SiSi(CH_3)Cl_2$; wherein, in the mixture, the number of diorgano-substituted silicon atoms does not exceed the number of monoorgano-substituted silicon atoms; and wherein the disilazane is $[(CH_3)_3Si]_2NH$.

8. A process as defined in claim 3 wherein a mixture of chlorine-containing disilanes is used; wherein the mixture contains $[Cl_2)CH_3)Si]_2$, $[Cl(CH_3)_2Si]_2$, and $Cl(CH_3)_2SiSi(CH_3)Cl_2$; wherein, in the mixture, the number of diorgano-substituted silicon atoms does not exceed the number of monoorgano-substituted silicon atoms; and wherein the disilazane is $[(CH_3)_3Si]_2NH$.

9. A process as defined in claim 4 wherein a mixture of chlorine-containing disilanes is used; wherein the mixture contains $[Cl_2(CH_3)Si]_2$, $[Cl(CH_3)_2Si]_2$, and $Cl(CH_3)_2SiSi(CH_3)Cl_2$; wherein, in the mixture, the number of diorgano-substituted silicon atoms does not exceed the number of monoorgano-substituted silicon atoms; and wherein the disilazane is $[(CH_3)_3Si]_2NH$.

10. A process as defined in claim 5 wherein a mixture of chlorine-containing disilanes is used; wherein the mixture contains $[Cl_2(CH_3)Si]_2$, $[Cl(CH_3)_2Si]_2$, and $Cl(CH_3)_2SiSi(CH_3)Cl_2$; wherein, in the mixture, the number of diorgano-substituted silicon atoms does not exceed the number of monoorgano-substituted silicon atoms; and wherein the disilazane is $[(CH_3)_3Si]_2NH$.

11. A process as defined in claim 6 wherein a mixture of chlorine-containing disilanes is used; wherein the mixture contains $[Cl_2(CH_3)Si]_2$, $[Cl(CH_3)_2Si]_2$, and $Cl(CH_3)_2SiSi(CH_3)Cl_2$; wherein, in the mixture, the number of diorgano-substituted silicon atoms does not exceed the number of monoorgano-substituted silicon atoms; and wherein the disilazane is $[(CH_3)_3Si]_2NH$.

12. A process as defined in claim 1 wherein the temperature is in the range of 125° C. to 300° C.

13. A process as defined in claim 2 wherein the temperature is in the range of 125° C. to 300° C.

14. A process as defined in claim 3 wherein the temperature is in the range of 125° C. to 300° C.

15. A process as defined in claim 7 wherein the temperature is in the range of 125° C. to 300° C.

16. A process as defined in claim 8 wherein the temperature is in the range of 125° C. to 300° C.

17. A process as defined in claim 9 wherein the temperature is in the range of 125° C. to 300° C.

18. A process as defined in claim 10 wherein the temperature is in the range of 125° C. to 300° C.

19. A process as defined in claim 11 wherein the temperature is in the range of 125° C. to 300° C.

20. A process for preparing an $R_3'SiNH$-containing metallosilazane polymer, which process consists of contacting and reacting in an inert, essentially anhydrous atmosphere, a chlorine-containing disilane or a mixture of chlorine-containing disilanes of the general formula $$(Cl_aR_bSi)_2,$$

a disilazane having the general formula $$(R_3'Si)_2NH,$$

and a metal halide at a temperature in the range of 25° C. and the boiling point of said metal halide and thereafter removing byproduced volatile products by distillation at a temperature of less than 300° C., wherein R is a vinyl radical, an alkyl radical containing 1–3 carbon atoms, or a phenyl radical;
R' is a vinyl radical, a hydrogen radical, an alkyl radical containing 1–3 carbon atoms, or a phenyl radical;
a has a value of 0.5–3;
b has a value of 0–2.5;
the sum of (a +b) is equal to three;
the metal atom of said metal halide is selected from the group consisting of boron, phosphorous, and titanium;
said metal halide is a liquid at the reaction temperature; and
the boiling point of said metal halide is less than 300° C.

21. A process as defined in claim 20 wherein said chlorine-containing disilane or mixture of chlorine-containing disilanes, said disilazane, and said metal halide are refluxed at a temperature in the range of 25° C. and the boiling point of said metal halide.

22. A process as defined in claim 20 wherein said R₃'SiNH-containing metallosilazane polymer contains 0.05 to 10.0 weight percent of said metal atom and wherein said metal halide is selected from the group consisting of BBr₃, TiCl₄, and PCl₃.

23. A process as defined in claim 21 wherein said R₃'SiNH-containing metallosilazane polymer contains 0.05 to 10.0 weight percent of said metal atom and wherein said metal halide is selected from the group consisting of BBr₃, TiCl₄, and PCl₃.

24. A process as defined in claim 22 wherein said R₃'SiNH-containing metallosilazane polymer contains 0.5 to 5.0 weight percent of said metal atom; wherein a mixture of chlorine-containing disilanes is used; wherein the mixture contains [Cl₂(CH₃)Si]₂, [Cl(CH₃)₂Si]₂, and Cl(CH₃)₂SiSi(CH₃)Cl₂; wherein, in the mixture, the number of diorgano-substituted silicon atoms does not exceed the number of monoorgano-substituted silicon atoms; and wherein the disilazane is [(CH₃)₂Si]₂NH.

25. A process as defined in claim 23 wherein said R₃'SiNH-containing metallosilazane polymer contains 0.5 to 5.0 weight percent of said metal atom; wherein a mixture of chlorine-containing disilanes is used; wherein the mixture contains [Cl₂(CH₃)Si]₂, [Cl(CH₃)₂Si]₂, and Cl(CH₃)₂SiSi(CH₃)Cl₂; wherein, in the mixture, the number of diorgano-substituted silicon atoms does not exceed the number of monoorgano-substituted silicon atoms; and wherein the disilazane is [(CH₃)₂Si]₂NH.

26. A composition of matter which is an R₃'SiNH-containing metallosilazane polymer which is prepared by the process of claim 1.

27. A composition of matter which is an R₃'SiNH-containing metallosilazane polymer which is prepared by the process of claim 2.

28. A composition of matter which is an R₃'SiNH-containing metallosilazane polymer which is prepared by the process of claim 3.

29. A composition of matter which is an R₃'SiNH-containing metallosilazane polymer which is prepared by the process of claim 4.

30. A composition of matter which is an R₃'SiNH-containing metallosilazane polymer which is prepared by the process of claim 5.

31. A composition of matter which is an R₃'SiNH-containing metallosilazane polymer which is prepared by the process of claim 6.

32. A composition of matter which is an R₃'SiNH-containing metallosilazane polymer which is prepared by the process of claim 7.

33. A composition of matter which is an R₃'SiNH-containing metallosilazane polymer which is prepared by the process of claim 8.

34. A composition of matter which is an R₃'SiNH-containing metallosilazane polymer which is prepared by the process of claim 9.

35. A composition of matter which is an R₃'SiNH-containing metallosilazane polymer which is prepared by the process of claim 10.

36. A composition of matter which is an R₃'SiNH-containing metallosilazane polymer which is prepared by the process of claim 11.

37. A composition of matter which is an R₃'SiNH-containing metallosilazane polymer which is prepared by the process of claim 12.

38. A composition of matter which is an R₃'SiNH-containing metallosilazane polymer which is prepared by the process of claim 13.

39. A composition of matter which is an R₃'SiNH-containing metallosilazane polymer which is prepared by the process of claim 14.

40. A composition of matter which is an R₃'SiNH-containing metallosilazane polymer which is prepared by the process of claim 15.

41. A composition of matter which is an R₃'SiNH-containing metallosilazane polymer which is prepared by the process of claim 16.

42. A composition of matter which is an R₃'SiNH-containing metallosilazane polymer which is prepared by the process of claim 17.

43. A composition of matter which is an R₃'SiNH-containing metallosilazane polymer which is prepared by the process of claim 18.

44. A composition of matter which is an R₃'SiNH-containing metallosilazane polymer which is prepared by the process of claim 19.

45. A composition of matter which is an R₃'SiNH-containing metallosilazane polymer which is prepared by the process of claim 20.

46. A composition of matter which is an R₃'SiNH-containing metallosilazane polymer which is prepared by the process of claim 24.

47. A composition of matter which is an R₃'SiNH-containing metallosilazane polymer which is prepared by the process of claim 25.

48. A process for preparing a ceramic material which consists of heating an R₃'SiNH-containing metallosilazane in an inert atmosphere or in a vacuum to at least a temperature of 750° C. until the R₃'SiNH-containing metallosilazane polymer is converted to ceramic material, which R₃'SiNH-containing metallosilazane polymer is obtained by a process which consists of contacting and reacting in an inert, essentially anhydrous atmosphere, a chlorine-containing, disilane or a mixture of chlorine-containing disilanes, wherein the number of diorgano-substituted silicon atoms does not exceed the number of monoorgano-substituted silicon atoms, of said disilanes having the general formula $(Cl_aR_bSi)_2$, a disilazane having the general formula $(R_3'Si)_2NH$, and a metal halide at a temperature in the range of 25° C. to 300° C. while distilling byproduced volatile products, wherein R is a vinyl radical, an alkyl radical containing 1–3 carbon atoms, or a phenyl radical;

R' is a vinyl radical, a hydrogen radical, an alkyl radical containing 1–3 carbon atoms, or a phenyl radical;

a has a value of 0.5–3;

b has a value of 0–2.5;

the sum of (a+b) is equal to three;

the metal atom of said metal halide is selected from the group consisting of boron, phosphorous, and titanium;

said metal halide is a liquid at the reaction temperature; and the boiling point of said metal halide is less than 300° C.

49. A process as defined in claim 48 wherein said R$_3$'SiNH-containing metallosilazane contains 0.05 to 10.0 weight percent of said metal atom and wherein said metal halide is selected from the group consisting of BBr$_3$, TiCl$_4$, and PCl$_3$.

50. A process as defined in claim 49 wherein said R$_3$'SiNH-containing metallosilazane polymer contains 0.5 to 5.0 weight percent of said metal atom; wherein a mixture of chlorine-containing disilanes is used; wherein the mixture contains [Cl$_2$(CH$_3$)Si]$_2$, [Cl(CH$_3$)$_2$Si]$_2$, and Cl(CH$_3$)$_2$SiSi(CH$_3$)Cl$_2$; and wherein the disilazane is [(CH$_3$)$_3$Si]$_2$NH.

51. A process as defined in claim 50 wherein the temperature is in the range of 125° C. and 300° C.

52. A ceramic material is prepared by the process of claim 48.

53. A ceramic material as prepared by the process of claim 49.

54. A ceramic material as prepared by the process of claim 50.

55. A ceramic material as prepared by the process of claim 51.

56. A process for preparing an R$_3$'SiNH-containing metallosilazane polymer, which process consists of contacting and reacting in an inert, essentially anhydrous atmosphere, a disilazane having the general formula (R$_3$'Si)$_2$NH, and a metal halide with (i) a mixture of a chlorine-containing disilane having the general formula (Cl$_a$R$_b$Si)$_2$ and a chlorine-containing monosilane having the general formula R$_n$'SiCl$_{4-n}$, (ii) a mixture of chlorine-containing disilanes having the general formula (Cl$_a$R$_b$Si)$_2$ mixed with a chlorine-containing monosilane having the general formula R$_n$'SiCl$_{4-n}$, or (iii) a mixture of chlorine-containing disilanes having the general formula (Cl$_a$R$_b$Si)$_2$ mixed with a mixture of chlorine-containing monosilanes having the general formula R$_n$'SiCl$_{4-n}$ at a temperature in the range of 25° C. to 300° C. while distilling byproduced volatile products, wherein
R is a vinyl radical, an alkyl radical containing 1-3 carbon atoms, or a phenyl radical;
R' is a vinyl radical, a hydrogen radical, an alkyl radical containing 1-3 carbon atoms, or a phenyl radical;
a has a value of 0.5-3;
b has a value of 0-2.5;
the sum of (a+b) is equal to three;
n has a value of 1 or 2;
the metal atom of said metal halide is selected from the group consisting of boron, phosphorous, and titanium;
said metal halide is a liquid at the reaction temperature; and
the boiling point of said metal halide is less than 300° C.

57. A process as defined in claim 56 wherein said R$_3$'SiNH-containing metallosilazane polymer contains 0.05 to 10.0 weight percent of said metal atom and wherein said metal halide is selected from the group consisting of BBr$_3$, TiCl$_4$, and PCl$_3$.

58. A process as defined in claim 57 wherein said R$_3$'NH-containing metallosilazane polymer contains 0.5 to 5.0 weight percent of said metal atom; wherein the mixtures (ii) or (iii) are used; wherein the chlorine-containing disilanes contain [Cl$_2$(CH$_3$)Si]$_2$, [Cl(CH$_3$)$_2$Si]$_2$, and Cl(CH$_3$)$_2$SiSi(CH$_3$)Cl$_2$; wherein, in the mixtures (ii) or (iii), the number of diorgano-substituted silicon atoms does not exceed the number of monoorgano-substituted silicon atoms; and wherein the disilazane is [(CH$_3$)$_3$Si]$_2$NH.

59. A process as defined in claim 58 wherein the temperature is in the range of 125° C. and 300° C. and the chlorine-containing monosilane or mixture of chlorine-containing monosilanes contains phenyl radicals.

60. A process as defined in claim 59 wherein the chlorine-containing monosilanes or mixture of chloro-containing monosilanes further contains vinyl radicals.

61. A composition of matter as prepared by the process of claim 56.

62. A composition of matter as prepared by the process of claim 58.

63. A method for preparing a ceramic article which consists of
(A) forming an article of the desired shape from an R$_3$'SiNH-containing metallosilazane polymer;
(B) heating the article prepared in (A) in an inert atmosphere or in a vacuum to an elevated temperature of at least 750° C. until the metallosilazane polymer is converted to a ceramic, which metallosilazane polymer is obtained by a process which consists of containing and reacting in an inert, essentially anhydrous atmosphere, a chlorine-containing disilane or a mixture of chlorine-containing disilanes, wherein the number of diorgano-substituted silicon atoms does not exceed the number of monoorgano-substituted silicon atoms of the general formula (Cl$_a$R$_b$Si)$_2$, a disilazane having the general formula (R$_3$'Si)$_2$NH, and a metal halide selected from the group consisting of BBr$_3$, TiCl$_4$, and PCl$_3$ at a temperature in the range of 125° C. to 300° C. while distilling byproduced volatile products, wherein
R is a vinyl radical, an alkyl radical containing 1-3 carbon atoms, or a phenyl radical;
R' is a vinyl radical, a hydrogen radical, an alkyl radical containing 1-3 carbon atoms, or a phenyl radical;

a has a value of 0.5-3;
b has a value of 0-2.5;
the sum of (a+b) is equal to three; and
the metal halide is present in such amounts so that the resulting metallosilazane polymer contains 0.05 to 10.0 weight percent of said metal atom.

64. A process as defined in claim 63 wherein a mixture of disilanes is used; wherein the mixture of disilanes contains $[Cl_2(CH_3)Si]_2$, $[Cl(CH_3)_2Si]_2$, and $Cl(CH_3)_2SiSi(CH_3)Cl_2$; and wherein said metal halide is present in such amounts so that the resulting metallosilazane polymer contains 0.5 to 5.0 weight percent of said metal atom.

65. A process as defined in claim 64 wherein said ceramic article is a fiber.

66. A ceramic article as prepared by the process of claim 63.

67. A ceramic article as prepared by the process of claim 64.

68. A ceramic article as prepared by the process of claim 65.

* * * * *

UNITED STATES PATENT AND TRADEMARK OFFICE
CERTIFICATE OF CORRECTION

PATENT NO.  : 4,482,689  
DATED       : November 13, 1984  
INVENTOR(S) : Loren A. Haluska Page 1 of 2

It is certified that error appears in the above-identified patent and that said Letters Patent is hereby corrected as shown below:

In column 5, line 42, "$R_n'SiCL_{4-n}$" should read -- $R_n'SiCl_{4-n}$ --.

In column 6, line 12, "metalloailazane" should read -- metallosilazane --.

In column 6, lines 13-14, "meatllosilazane" should read -- metallosilazane --.

In column 7, line 49, "$BBr_2l$, $BBrl_2$, $Bl_3$," should read -- $BBr_2I$, $BBrI_2$, $BI_3$, --.

In column 11, line 62, "argon," should read -- argon. --.

In column 13, line 5, "$(CH_3)_3SiCI$" should read -- $(CH_3)_3SiCl$ --.

In column 13, line 50, "ws" should read -- was --.

In column 14, line 25, "of 210°" should read -- to 210° --.

In column 14, line 31, "cermaic" should read -- ceramic --.

In column 14, lines 33-34, "of the material" should read -- of the ceramic material --.

In column 15, line 9, "dded" should read -- added --.

In column 15, line 21, "1345 cm$^-$" should read -- 1345 cm$^{-1}$ --.

UNITED STATES PATENT AND TRADEMARK OFFICE
CERTIFICATE OF CORRECTION

PATENT NO. : 4,482,689

DATED : November 13, 1984

INVENTOR(S) : Loren A. Haluska

It is certified that error appears in the above-identified patent and that said Letters Patent is hereby corrected as shown below:

In column 15, line 43, "metallosilazne" should read -- metallosilazane --.

In column 20, line 19, "equadrupole" should read -- quadrupole --.

In column 21, line 59, "$[Cl_2)CH_3)Si]_2$" should read -- $[Cl_2(CH_3)Si]_2$ --.

In column 26, lines 31-32, "chloro-containing" should read -- chlorine-containing --.

Signed and Sealed this

Ninth Day of April 1985

[SEAL]

Attest:

DONALD J. QUIGG

Attesting Officer

Acting Commissioner of Patents and Trademarks